United States Patent
Kodato et al.

(10) Patent No.: US 12,473,017 B2
(45) Date of Patent: Nov. 18, 2025

(54) CONTROL DEVICE, METHOD FOR CONTROLLING SAME, AND ELECTRIC POWER STEERING DEVICE

(71) Applicant: Hitachi Astemo, Ltd., Hitachinaka (JP)

(72) Inventors: Masaki Kodato, Hitachinaka (JP); Tsukasa Miyajima, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 0 days.

(21) Appl. No.: 18/692,083

(22) PCT Filed: Aug. 30, 2022

(86) PCT No.: PCT/JP2022/032524
§ 371 (c)(1),
(2) Date: Mar. 14, 2024

(87) PCT Pub. No.: WO2023/095407
PCT Pub. Date: Jun. 1, 2023

(65) Prior Publication Data
US 2024/0383525 A1 Nov. 21, 2024

(30) Foreign Application Priority Data
Nov. 26, 2021 (JP) .................................. 2021-191836

(51) Int. Cl.
*B62D 5/04* (2006.01)
*B62D 6/00* (2006.01)

(52) U.S. Cl.
CPC ........... *B62D 5/0463* (2013.01); *B62D 6/008* (2013.01)

(58) Field of Classification Search
CPC ........ B62D 5/0463; B62D 6/008; B62D 5/04; B62D 6/00

(Continued)

(56) References Cited

U.S. PATENT DOCUMENTS

2008/0199160 A1 8/2008 Yamazaki
2020/0070872 A1* 3/2020 Ushiro ..................... B62D 5/04
(Continued)

FOREIGN PATENT DOCUMENTS

JP 2004-175196 A 6/2004
JP 2007-216745 A 8/2007
WO WO-2019/193976 A1 10/2019

OTHER PUBLICATIONS

International Search Report dated Nov. 22, 2022 issued in International Application No. PCT/JP2022/032524, with English translation, 5 pages.

(Continued)

*Primary Examiner* — Yi-Kai Wang
(74) *Attorney, Agent, or Firm* — FOLEY & LARDNER LLP

(57) ABSTRACT

Provided is a control device to be used for a vehicle including: a steering wheel configured to steer the vehicle; a steering member configured to steer steered wheels in accordance with rotation of the steering wheel; and a steering actuator configured to apply a steering force to the steering member, the control device including a control unit configured to output, to the steering actuator, a drive signal for applying the steering force based on steering information on the steering wheel. The control unit is configured to output, to the steering actuator, a drive signal for reducing the steering force until the steering member reaches a stroke end after a rotation angle of the steering wheel reaches a predetermined control start angle and increasing the steering force when the steering member reaches the stroke end and then bounces back.

16 Claims, 7 Drawing Sheets

(58) Field of Classification Search
USPC .......................................................... 701/41
See application file for complete search history.

(56) References Cited

U.S. PATENT DOCUMENTS

2020/0130736 A1* 4/2020 Kodera ................ B62D 5/0463
2022/0315097 A1* 10/2022 Yoshida ................ B62D 6/008

OTHER PUBLICATIONS

Written Opinion dated Nov. 22, 2022 issued in International Application No. PCT/JP2022/032524, with English translation, 6 pages.

* cited by examiner

CONTROL DEVICE, METHOD FOR CONTROLLING SAME, AND ELECTRIC POWER STEERING DEVICE

TECHNICAL FIELD

The present invention relates to a steering device to be mounted to an automobile, and more particularly, to an electric power steering device which executes steering control through use of an electric motor.

BACKGROUND ART

In an electric power steering device, when steering is executed until a rack bar approaches a stroke end, there occurs a phenomenon in which the rack bar abuts against another structure member (for example, a mechanical stopper mechanism) in the vicinity of the stroke end, and impact noise occurs due to the abutment.

In order to address this problem, there has been proposed a configuration in which, in order to reduce the impact at the time of the abutment of the rack bar against another structure member, output of an electric motor which applies an assist force to a rotation operation of a steering wheel is reduced before the abutment of the rack bar.

For example, in JP 2007-216745 A (Patent Literature 1), when it is determined that the rack bar reaches the stroke end, an upper limit of a target current value determined by target current determination means is set to a predetermined value, to thereby limit the target current value. With this configuration, when it is detected that the rack bar reaches the stroke end, the upper limit of the target current value is set to the predetermined value, and hence it is possible to prevent generation of an excessive assist force.

CITATION LIST

Patent Literature

PTL 1: JP 2007-216745 A

SUMMARY OF INVENTION

Technical Problem

In the method as described in Patent Literature 1, bouncing back after the stroke end is reached is not considered.

Solution to Problem

One object of the present invention is to provide an electric power steering device which increases operation feeling before and after a stroke end.

According to one embodiment of the present invention, there is provided a control device which is to be used for a vehicle including: a steering wheel configured to steer the vehicle; a steering member configured to steer steered wheels in accordance with rotation of the steering wheel; and a steering actuator configured to apply a steering force to the steering member, the control device including a control unit configured to output, to the steering actuator, a drive signal for applying the steering force based on steering information on the steering wheel. The control unit is configured to output, to the steering actuator, a drive signal for reducing the steering force until the steering member reaches a stroke end after a rotation angle of the steering wheel reaches a predetermined control start angle and increasing the steering force when the steering member reaches the stroke end and then bounces back.

According to the one embodiment of the present invention, the electric power steering device capable of increasing operation feeling before and after the stroke end can be provided.

DESCRIPTION OF EMBODIMENTS

Now, a detailed description is given of an embodiment of the present invention with reference to the drawings, but the present invention is not limited to the following embodiment, and includes various modifications and application examples in the scope thereof within a technical concept of the present invention.

Before the description of the embodiment of the present invention, a configuration of an electric power steering device which is a premise of the present invention is described.

Figure 1:
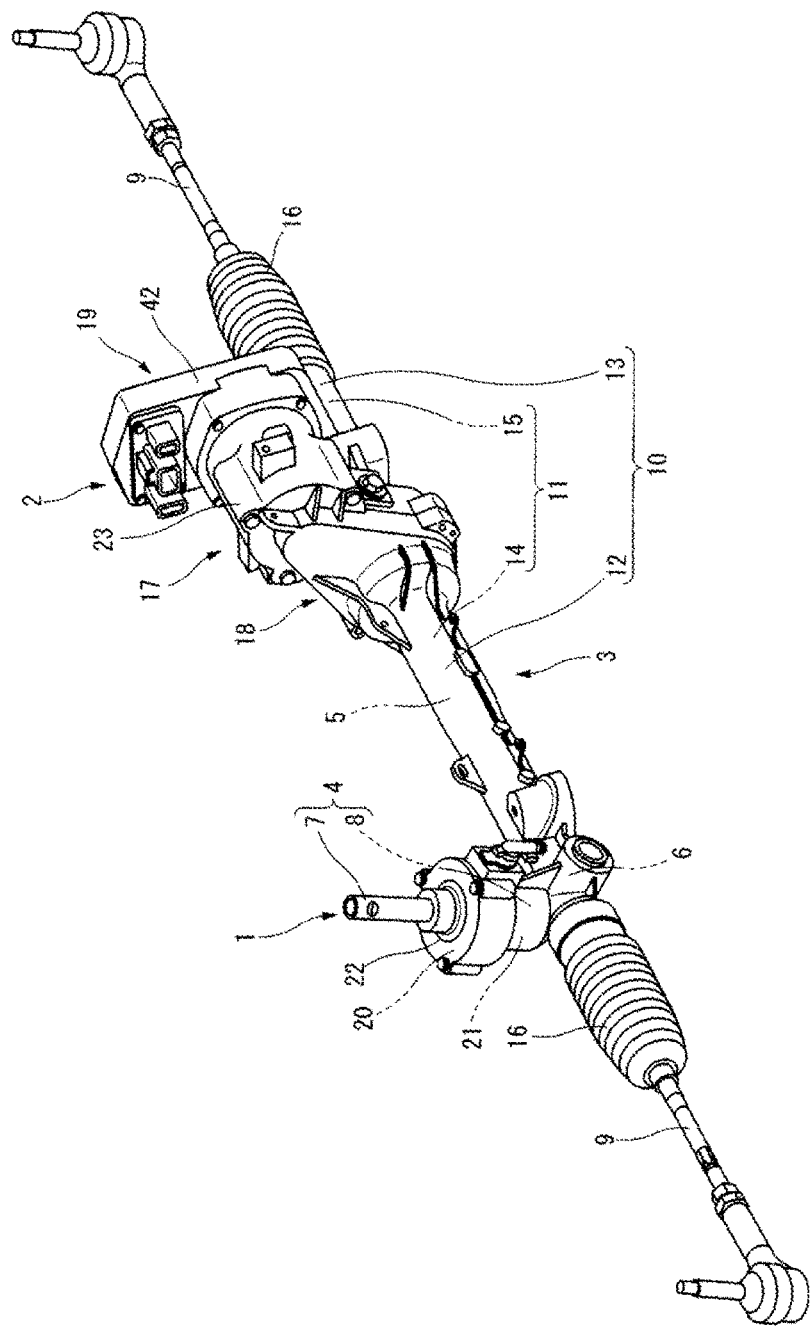
FIG. 1 is a perspective view for illustrating an exterior of an electric power steering device.
Figure 2:
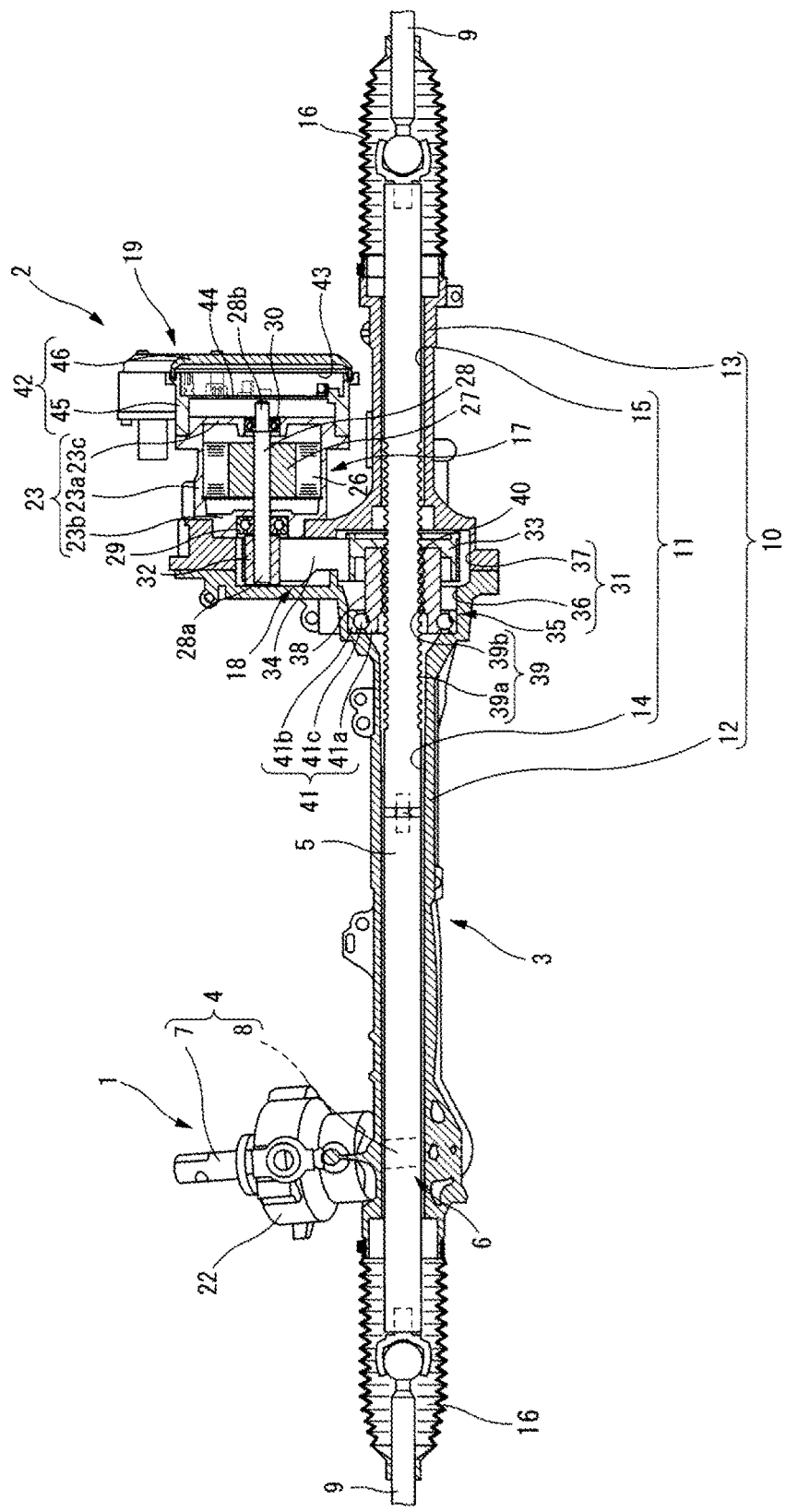
FIG. 2 is a cross-sectional view for illustrating a vertical cross section of the electric power steering device of FIG. 1.

FIG. 1 and FIG. 2 are illustrations of an electric power steering device which detects, independently of drive (manual steering force) of a steering axle (hereinafter referred to as "rack bar") by a steering shaft rotated by a steering wheel, a turning angle, a turning direction, and a turning torque of the steering shaft, rotates an electric motor (corresponding to "steering actuator" in the claims) based on detection signals thereof (corresponding to "steering information" in the claims), transmits the rotation of the electric motor to a nut, and drives the rack bar accommodated in the nut, to thereby assist in the steering force.

The steering mechanism 1 includes a steering shaft 4, a rack bar 5, and a conversion mechanism 6. The steering shaft 4 is connected to a steering wheel (not shown) disposed in a cabin of a vehicle. The rack bar 5 serves as a steering axle linked to steered wheels. The conversion mechanism 6 links the steering shaft 4 and the rack bar 5 to each other. The conversion mechanism 6 is a so-called rack and pinion mechanism formed of pinion teeth (not shown) formed on an outer circumference of the steering shaft 4 and rack teeth (not shown) formed on an outer circumference of the rack bar 5.

The rack bar 5 represents a steering member. As the steering member, in addition to the rack bar 5, there exist pitman arms. Further, the steering member is not limited thereto, and may include a link mechanism provided between the steering actuator and the steered wheels, and the like.

The steering shaft 4 includes an input shaft 7 and an output shaft 8. One end side of the input shaft 7 in an axial direction is coupled to the steering wheel such that the input shaft 7 can integrally rotate with the steering wheel. One end side of the output shaft 8 in the axial direction is connected to another end side of the input shaft 7 in the axial direction via a torsion bar (not shown).

Each of both end portions of the rack bar 5 in the axial direction is associated with one of the pair of steered wheels via one of tie rods 9 and one of a pair of knuckle arms. As a result, when the rack bar 5 moves in the axial direction, directions of the pair of steered wheels are changed by each knuckle arm being pulled via each tie rod 9.

Moreover, the rack bar 5 is accommodated in a rack bar accommodation portion 11 of a rack housing 10 having a substantially cylindrical shape forming a part of a housing 3 such that the rack bar 5 can move in the axial direction under a state in which both end portions thereof in the axial direction are exposed to the outside. The rack housing 10 is formed such that the rack housing 10 is divided into two portions in the axial direction by casting, and is integrated by fastening, with a plurality of bolts (not shown), a first housing 12 which accommodates one end side of the rack bar 5 in the axial direction and a second housing 13 which accommodates another end side of the rack bar 5 in the axial direction to each other.

The rack bar accommodation portion 11 is formed of a first rack bar accommodation portion 14 and a second rack bar accommodation portion 15. The first rack bar accommodation portion 14 passes through an inside of the first housing 12 in the axial direction. The second rack bar accommodation portion 15 passes through an inside of the second housing 13 in the axial direction.

Moreover, a boot 16 formed in a bellows shape is installed over the tie rod 9 on each of both end portions of the rack housing 10 in the axial direction. Those boots 16 are formed from an elastic material such as a synthetic rubber material so as to secure predetermined flexibility, and suppress entry of water, dusts, and the like to the inside of the housing 3.

A steering assist mechanism 2 includes an electric motor 17, a transmission mechanism 18, various sensors, and a controller (corresponding to "control unit" in the claims) 19. The electric motor 17 is a drive unit which generates a steering assist force (steering force). The transmission mechanism 18 transmits the driving force of the electric motor 17 to the rack bar 5. The various sensors detect various state quantities of the power steering device. The controller 19 applies drive control to the electric motor 17 based on signals output by the various sensors, and the like. The electric motor 17 and the transmission mechanism 18 form the steering actuator.

Of the various sensors, both of a steering angle sensor 20 and a torque sensor 21 are accommodated in a sensor housing 22 being a part of the housing 3 formed such that the housing 3 and the sensor housing 22 surround an outer circumference of the steering shaft 4. The steering angle sensor 20 detects a steering angle (corresponding to a steering wheel angle described later) being a turning amount of the steering wheel from a neutral steering angle. The torque sensor 21 detects a torque input to the steering shaft 4.

The steering angle sensor 20 is mounted to an outer circumference of the input shaft 7 of the steering shaft 4, and detects the steering angle based on a turning angle of the input shaft 7. Moreover, the steering angle sensor 20 includes steering angle detection units 20a and 20b forming a duplex system including main and sub systems, and each thereof detects the steering angle.

The torque sensor 21 is provided such that the torque sensor 21 spans the input shaft 7 and the output shaft 8, and detects a torque based on a displacement amount of relative rotation between the input shaft 7 and the output shaft 8. Moreover, the torque sensor 21 includes torque detection units 21a and 21b forming a duplex system including main and sub systems, and each thereof detects the steering torque. The steering angle sensor 20 and the torque sensor 21 are electrically connected to the controller 19 via a harness (not shown) provided along an outer circumference of the rack housing 10.

The electric motor 17 is a so-called three-phase AC motor to be driven based on a three-phase AC power, and includes a motor housing 23 and a motor element. The motor housing 23 forms a part of the housing 3. The motor element is provided in the motor housing 23. The motor housing 23 includes a tubular portion 23a and first and second end wall portions 23b and 23c. The tubular portion 23a has a cylindrical shape, and internally accommodates the motor element. Each of the first and second end wall portions 23b and 23c closes one of opening portions of the tubular portion 23a.

The motor element includes a stator 26, a rotor 27, and a motor shaft 28. The stator 26 has a tubular shape and is fixed by, for example, shrink-fitting, to an inner circumferential surface of the tubular portion 23a. The rotor 27 has a tubular shape and is disposed on an inner circumferential side of the stator 26 such that a predetermined gap is provided therebetween in its radial direction. The motor shaft 28 is fixed to the inner circumferential side of the rotor 27 such that the motor shaft 28 can rotate integrally therewith, to thereby output rotation of the rotor 27.

The stator 26 is formed by winding U-phase, V-phase, and W-phase coils on a stator core (not shown) formed by stacking a plurality of thin plates. In this embodiment, the coils are connected as the so-called Y connection (star connection), but the coils may be connected as the delta connection.

Both end portions 28a and 28b of the motor shaft 28 are exposed from the motor housing 23 via through-holes formed through the first and second end wall portions 23b and 23c, respectively. Of both end portions 28a and 28b, the one end portion 28a on a side opposite from the controller 19 faces an inside of a transmission mechanism accommodation portion 31 which accommodates the transmission mechanism 18 and is described later. Meanwhile, the another end portion 28b faces the inside of an accommodation portion 43 which accommodates the controller 19 and is described later.

Moreover, the motor shaft 28 is rotatably supported by a first ball bearing 29 and a second ball bearing 30. The first ball bearing 29 is provided between an outer circumferential surface on the one end portion 28a side and an inner circumferential surface of the through-hole of the first end wall portion 23b. The second ball bearing 30 is provided between an outer circumferential surface on the another end portion 28b side and an inner circumferential surface of the through-hall of the second end wall portion 23c.

The transmission mechanism 18 is accommodated inside the transmission mechanism accommodation portion 31 of the housing 3, and includes an input-side pulley 32 and an output-side pulley 33, a belt 34, and a ball screw mechanism 35. The belt 34 is wound between both of the pulleys 32 and 33. The ball screw mechanism 35 converts rotation of the output-side pulley 33 to an axial motion of the rack bar 5 while reducing the speed of the rotation.

The transmission mechanism accommodation portion 31 is formed by joining a first transmission mechanism accommodation portion 36 and a second transmission mechanism accommodation portion 37 to each other. The first transmission mechanism accommodation portion 36 is provided in an end portion of the first rack bar accommodation portion 14 on the second housing 13 side. The second transmission mechanism accommodation portion 37 is provided in an end portion of the second rack bar accommodation portion 15 on the first housing 12 side.

The input-side pulley 32 is formed in a cylindrical shape having a relatively small diameter compared with the output-side pulley 33, and is pressed onto and fixed to the one end portion 28a of the motor shaft 28 of the electric motor 17 via a through-hole formed through an inner circumferential side.

The output-side pulley 33 is disposed on the outer circumferential side of the rack bar 5, and is linked to the rack bar 5 via the ball screw mechanism 35. In more detail, the output-side pulley 33 exhibits a bottomed cylindrical shape having a relatively large diameter compared with the input-side pulley 32, is fixed to the outer circumference of a nut 38 which is of the ball screw mechanism 35 and is described later, and rotates integrally with the nut 38.

The belt 34 is a belt which has an endless shape, and in which glass fibers, steel wires, and the like are embedded as a core material, and rotates the input-side pulley 32 and the output-side pulley 33 in synchronism with each other, to thereby transmit a rotational force of the input-side pulley 32 to the output-side pulley 33.

The ball screw mechanism 35 includes the nut 38, a ball circulation groove 39, a plurality of balls 40, and a circulation mechanism (not shown). The nut 38 has a tubular shape, and is disposed on the outer circumferential side of the rack bar 5. The ball circulation groove 39 is formed between the nut 38 and the rack bar 5. The plurality of balls 40 are provided in the ball circulation groove 39 such that the balls 40 can roll. The circulation mechanism circulates each ball 40 from one end side to another end side of the ball circulation groove 39.

The nut 38 is rotatably supported via a ball bearing 41 accommodated in the first transmission mechanism accommodation portion 36. The ball bearing 41 includes an inner race portion 41a, an outer race portion 41b, and a plurality of balls 41c. The inner race portion 41a is formed integrally with the nut 38. The outer race portion 41b is fixed to an inner circumferential surface of the first transmission mechanism accommodation portion 36. The plurality of balls 41c are accommodated between the inner race portion 41a and the outer race portion 41b such that the balls 41c can roll. In this embodiment, such a configuration that the inner race portion 41a and the nut 38 are formed integrally with each other is exemplified, but the inner race portion 41a and the nut 38 may be independent of each other.

The ball circulation groove 39 is formed of a shaft-side ball screw groove 39a and a nut-side ball screw groove 39b. The shaft-side ball screw groove 39a has a spiral groove shape provided on the outer circumferential side of the rack bar 5. The nut-side ball screw groove 39b has a spiral groove shape provided on an inner circumferential side of the nut 38.

The controller 19 includes a control housing 42 and a control board 44. The control housing 42 forms a part of the housing 3. The control board 44 is accommodated in the accommodation portion 43 of the control housing 42.

The control housing 42 includes a body 45 and a cover 46. The body 45 has a tubular shape having one end portion on the electric motor 17 side overlapping an outer circumference of the motor housing 23. The cover 46 closes an opening portion on another end portion side of the body 45.

The control board 44 is formed by forming a conductor pattern on each of both of front and rear surfaces of a board made of a non-conductive resin material represented by a glass epoxy resin, and mounting a large number of electronic components and electric components on those conductor patterns.

Moreover, a motor rotation angle sensor which is one of the various sensors, and detects a motor rotation angle being a rotation angle of the rotor 27 of the electric motor 17 is provided on the control board 44, which is not shown in FIG. 2.

This motor rotation angle sensor detects the rotation angle of the motor shaft 28 (rotor 27) based on a change in a magnetic field generated by a magnet (not shown) mounted to the another end portion 28b of the motor shaft 28. Moreover, the motor rotation angle sensor includes main and sub motor rotation angle detection units of a duplex system, and each thereof detects the rotation angle of the motor shaft 28.

A configuration of the controller 19 which controls the electric motor 17 forming the steering actuator to be used for the electric power steering device is now described.

Figure 3:
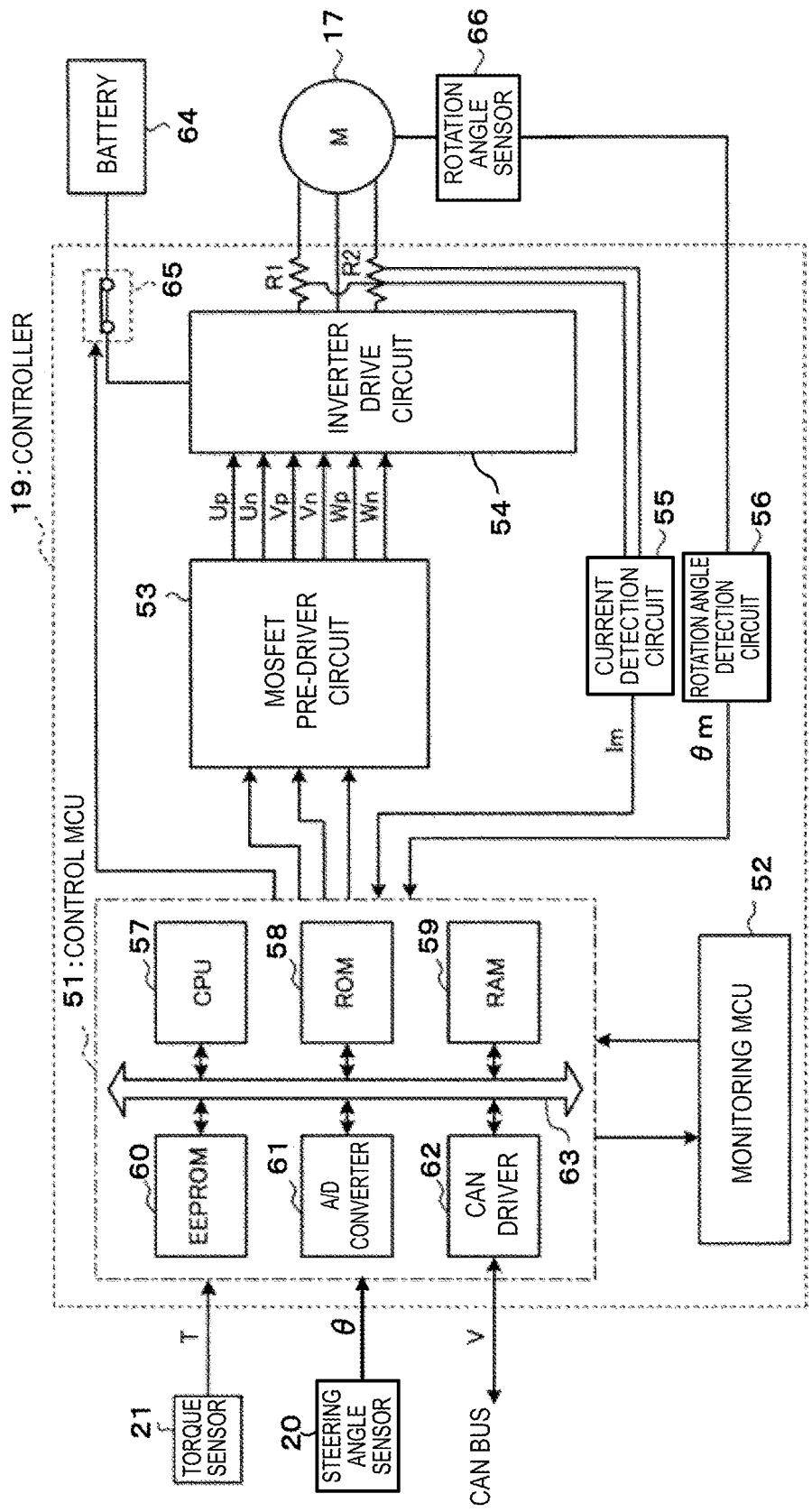
FIG. 3 is a control block diagram for illustrating a configuration of a controller used for the electric power steering device.

FIG. 3 is an illustration of a hardware configuration of the controller 19 of FIG. 1. As illustrated in FIG. 3, the controller 19 includes a micro control unit for control (control MCU) 51, a micro control unit for monitoring (monitoring MCU) 52, a MOSFET pre-driver circuit 53, an inverter drive circuit 54, a current detection circuit 55, a rotation angle detection circuit 56, and the like. The inverter drive circuit 54 is a motor drive circuit.

The micro control unit for control 51 includes a CPU 57, a ROM 58, a RAM 59, an EEPROM (flash ROM) 60, an A/D converter 61, a CAN driver 62, a bus line 63, and the like. The CPU 57 is a calculation device. The ROM 58, the RAM 59, and the EEPROM 60 are memories.

The CPU 57 executes various programs stored in the ROM 58, to thereby control the electric motor 17 of the electric power steering device. Thus, an operation executed by the program can be considered as a control function.

The ROM 58 stores the various programs executed by the CPU 57. Specifically, a control program for executing motor control processing (steering processing) of controlling the electric motor 17 is stored in the ROM 58. Further, a diagnosis program for executing diagnosis for the power steering device is stored in this ROM 58. The control program and the diagnosis program execute a predetermined control function and diagnosis function, respectively, by the CPU 57.

The RAM 59 is used as a work area for the CPU 57 when the CPU 57 executes the control program, and data and processing results required in the process of processing are temporarily stored therein. Similarly, the diagnosis program is executed, and a diagnosis result is temporarily stored as error codes.

The EEPROM 60 is a memory which can hold content stored therein even after a power supply is disconnected, and correction values unique to hardware and the error codes after the execution of the diagnosis function are stored therein. In this case, a shutoff function of disconnecting supply of a power supply voltage delays shutdown of the controller 19 by a time required to transfer the error codes from the RAM 59 to the EEPROM 60.

The A/D converter 61 receives inputs of steering angle information from the steering angle sensor 20, torque information from the torque sensor 21, current information on the electric motor 17 from the current detection circuit 55, motor rotation angle information from the rotation angle detection circuit 56, and the like, and converts the information to digital signals. It is also possible to estimate the steering angle from the rotation angle detection circuit 56.

The CAN driver 62 is connected to a CAN bus, and is an interface which executes CAN communication to/from another controller and sensors via the CAN bus. For example, the CAN driver 62 can receive a vehicle speed (V: vehicle speed pulse) from a vehicle speed sensor via the CAN communication.

The MOSFET pre-driver circuit 53 converts a PWM control signal in each of phases being the U phase, the V phase, and the W phase input from the micro control unit for control 51 to positive and negative energization signals (Up, Un, Vp, Vn, Wp, and Wn) in each of phases, and outputs the energization signals to the inverter drive circuit 54.

The inverter drive circuit 54 is an inverter drive circuit including bridge circuits, each of which is formed of a pair of MOSFET switching elements, for the three phases being the U phase, the V phase, and the W phase, and a freewheeling diode is connected in parallel to each MOSFET switching element.

To this bridge circuit, a DC voltage is applied from a battery 64 via a power supply relay 65. The energization signal is input from the MOSFET pre-driver circuit 53 to a control terminal (gate terminal) of each MOSFET switching element.

The DC voltage applied to the inverter drive circuit 54 is converted to three-phase AC voltages through switching operation of the MOSFET switching elements in the inverter drive circuit 54, and the electric motor 17 is driven by the AC voltages. To the bridge circuit, shunt resistors R1 and R2 are connected.

The current detection circuit 55 is connected to those shunt resistors R1 and R2. Current information on the electric motor 17 is detected with this configuration, and is output to the A/D converter 61. Moreover, the rotation angle detection circuit 56 outputs, to the A/D converter 61, as the motor rotation angle information, an output signal from a motor rotation angle sensor 66 which detects the motor rotation angle being the rotation angle of the rotor of the electric motor 17. This motor rotation angle sensor 66 includes main and sub motor rotation angle detection units of a duplex system, and each thereof detects the rotation angle of the motor shaft 28.

The micro control unit for monitoring 52 includes a CPU, a ROM, a RAM, a D/A converter, an A/D converter, an interface, and the like, which is not shown, but is well known. The micro control unit for monitoring 52 monitors runaway of the CPU 57 of the micro control unit for control 51, and the like.

In the above-mentioned electric power steering device, as described above, when steering is executed so that the rack bar approaches the vicinity of a stroke end, there occurs a phenomenon in which the rack bar abuts against another structure member (mechanical stopper mechanism) in the vicinity of the stroke end. Thus, there is a problem in that impact noise caused by the abutment occurs or unintended rotation of the steering wheel caused by bouncing back after the abutment occurs, and hence a sense of discomfort is felt in the operation.

Thus, in this embodiment, there is proposed an electric power steering device including a steering force adjustment unit which outputs, to the steering actuator, a drive signal for reducing the steering force until the steering member reaches the stroke end after the rotation angle of the steering wheel (hereinafter the rotation angle of the steering wheel may also be referred to as "steering wheel angle") reaches a predetermined control start angle, and outputs, to the steering actuator, a drive signal for increasing the steering force when the steering member reaches the stroke end and then bounces back.

That is, the following configuration is proposed. When the rack bar approaches the stroke end, the steering force (hereinafter referred to as "assist torque") of the steering member is reduced, to thereby be able to suppress the impact noise caused by the collision. When the rack bar bounces back, the assist torque of the steering member is increased to hold down the bouncing back of the rack bar, to thereby be able to suppress the unintended rotation of the steering wheel.

In particular, this embodiment has a feature that an angle difference between a torque correction steering wheel angle freely set based on an actual steering wheel angle and the actual steering wheel angle is obtained, a negative correction torque and a positive correction torque are obtained by applying proportional integral control to this angle difference, and the assist torque is corrected through use of the obtained correction torque. The negative correction torque includes a component which reduces the torque for biasing the rack bar toward the direction of the stroke end, and the positive correction torque includes a component which increases the torque for biasing the rack bar toward the direction of the stroke end.

As described above, there is provided such a configuration that the proportional integral control is used to obtain the negative correction torque and the positive correction torque from the angle difference between the actual steering wheel angle of the steering wheel and the torque correction steering wheel angle set based thereon, and then, the assist torque is corrected with the obtained correction torque. Thus, the impact noise caused by the abutment and the unintended rotation of the steering wheel caused by the bouncing back after the abutment can be suppressed through the simple control logic without newly installing another detection sensor.

Figure 4:
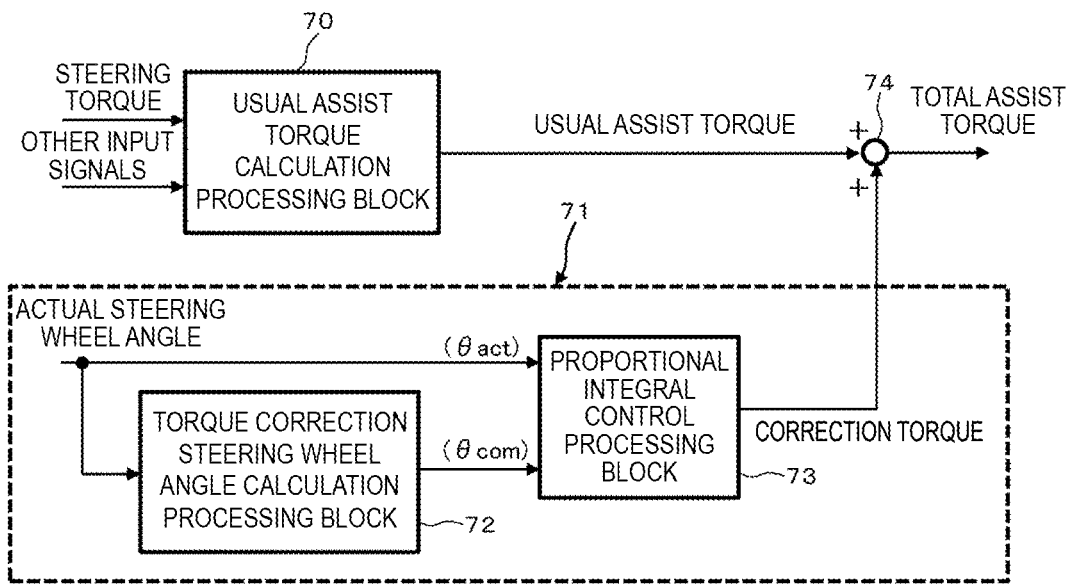
FIG. 4 is a block diagram for illustrating control blocks for obtaining an assist force (assist torque) in an embodiment of the present invention.

In FIG. 4, a control block (steering force adjustment unit) for obtaining a total assist torque to be applied to the electric motor is illustrated.

In FIG. 4, a usual assist torque calculation processing block (corresponding to "usual steering force generation unit" in the claims) 70 uses input information such as the steering torque applied by the steering wheel, the steering angle, and the vehicle speed of an automobile to calculate a usual assist torque. This calculation of the usual assist torque is a well-known matter, and hence a detailed description thereof is herein omitted.

After that, the calculated usual assist torque and a steering force (manual steering force) of the steering wheel by a driver are composed into a rack axial force which displaces the rack bar 5, and this rack axial force steers the steered wheels. This embodiment is obtained by adding, to this electric power steering device, a torque correction function unit (corresponding to "correction steering force generation unit" in the claims) 71 described below.

The torque correction function unit 71 is formed of a torque correction steering wheel angle calculation processing block 72, a proportional integral control processing block 73, and an addition block 74. The torque correction steering wheel angle calculation processing block 72 obtains a torque correction steering wheel angle (θcom) generated based on an actual steering wheel angle (θact). The proportional integral control processing block 73 applies the proportional integral control to a difference (angle difference) between the actual steering wheel angle (θact) and the torque correction steering wheel angle (θcom) to obtain the correction torque. The addition block 74 adds the obtained correction torque to the usual assist torque.

As the correction torque obtained by the torque correction function unit 71, the negative correction torque and the positive correction torque are generated. The negative correction torque reduces the usual assist torque, and the positive correction torque increases the usual assist torque, to thereby obtain the total assist torque. That is, the negative correction torque acts toward a direction for reducing the rack axial force, and the positive correction torque acts toward a direction for increasing the rack axial force.

Specifically, when the rack bar 5 approaches the stroke end, the usual assist torque is reduced through the negative correction torque, to thereby achieve an action of suppressing the impact noise caused by the collision. Meanwhile, when the rack bar 5 bounces back, the usual assist torque is increased through the positive correction torque to hold down the bouncing back of the rack bar 5, to thereby achieve an action of suppressing the unintended rotation of the steering wheel.

As a result of those actions, it is possible to solve the problem in that the impact noise caused by the abutment occurs or the unintended rotation of the steering wheel caused by the bouncing back after the abutment occurs, and hence the sense of discomfort is felt in the operation.

The torque correction steering wheel angle (θcom) calculated in the torque correction steering wheel angle calculation processing block 72 is now described.

Figure 5:
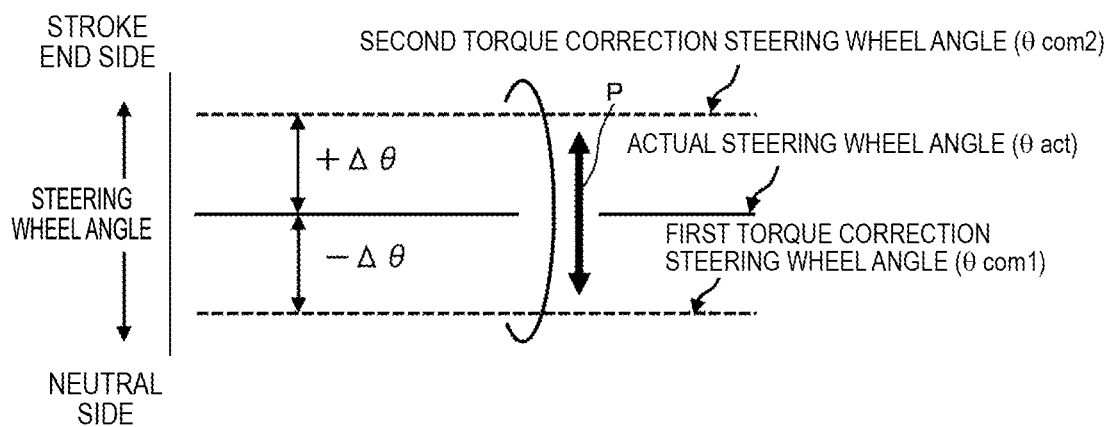
FIG. 5 is an explanatory diagram for illustrating a torque correction steering wheel angle obtained by a torque correction steering wheel angle calculation block of FIG. 4.

In FIG. 5, in the torque correction steering wheel angle calculation processing block 72, the torque correction steering wheel angle (θcom) is obtained by adding a predetermined correction angle (Δθ) to, or subtracting the predetermined correction angle (Δθ) from, the input actual steering wheel angle (θact).

That is, a first torque correction steering wheel angle (θcom1) is obtained by subtracting the correction angle (Δθ) from the actual steering wheel angle (θact), and a second torque correction steering wheel angle (θcom2) is obtained by adding the correction angle (Δθ) to the actual steering wheel angle (θact). Thus, as indicated by a movement of an arrow (P), the first torque correction steering wheel angle (θcom1) and the second torque correction steering wheel angle (θcom2) also simultaneously change following a change in the actual steering wheel angle (θact). The correction angle (Δθ) is the same value, but may be set individually.

After that, the torque correction steering wheel angle calculation processing block 72 outputs the first torque correction steering wheel angle (θcom1) when the rack bar 5 is in the direction of approaching the stroke end, and outputs the second torque correction steering wheel angle (θcom2) when the rack bar 5 is in the direction of bouncing back (this configuration is described with reference to a flowchart of FIG. 7). Then, the first torque correction steering wheel angle (θcom1) or the second torque correction steering wheel angle (θcom2) is input to the proportional integral control processing block 73 together with the actual steering wheel angle (θact).

Figure 6:
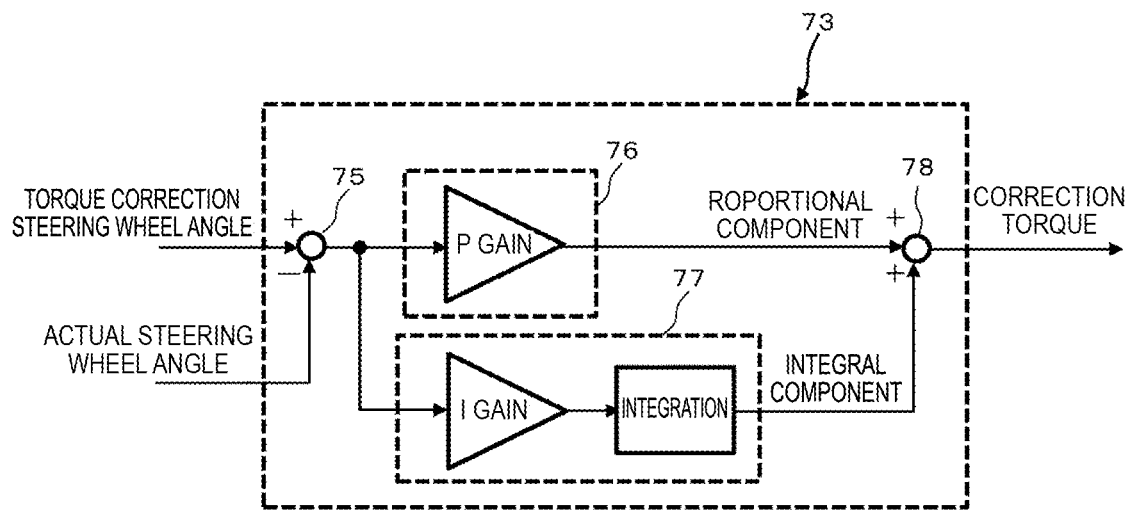
FIG. 6 is a block diagram for illustrating specific control blocks of a proportional integral control processing block of FIG. 4.
Figure 8:
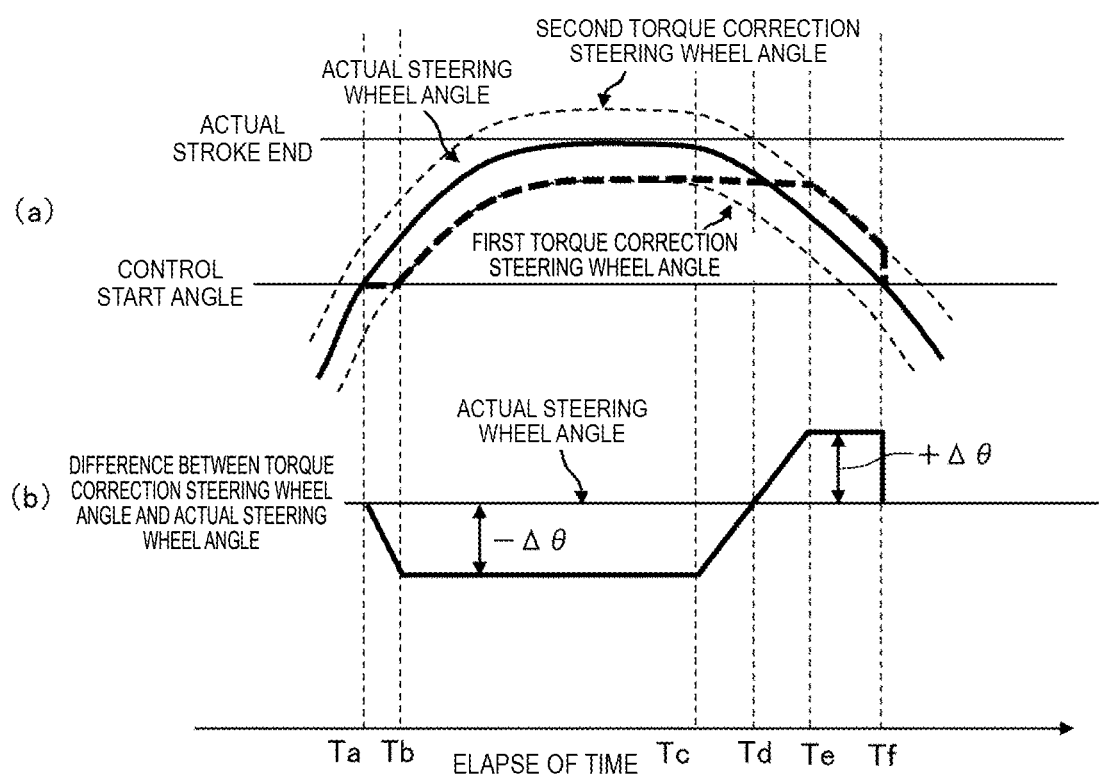
FIG. 8 are explanatory graphs for showing torque correction steering wheel angles obtained through the processing flow of FIG. 7.

A configuration of the proportional integral control processing block 73 is illustrated in FIG. 6. To the proportional integral control processing block 73, the actual steering wheel angle (θact) and the torque correction steering wheel angle (θcom) obtained in the torque correction steering wheel angle calculation processing block 72 are input. Calculation of "(θcom)−(θact)" is executed for this input in a difference calculation unit 75, to thereby obtain the angle difference. The angle difference is as illustrated in FIG. 8, and is described later.

When the first torque correction steering wheel angle (θcom1) and the second torque correction steering wheel angle (θcom2) are input, the angle differences (±Δθ) have the constant values as illustrated in FIG. 5. However, as described with reference to the flowchart of FIG. 7, in a transition section between the first torque correction steering wheel angle (θcom1) and the second torque correction steering wheel angle (θcom2), the torque correction steering wheel angle (θcom) before the start of the transition continues to be used.

For the obtained angle difference, a proportional component is obtained in a proportional control unit 76 of the proportional integral control processing block 73, and an integral component is similarly obtained in an integral control unit 77 thereof. The proportional component and the integral component are added to each other in an addition unit 78, and a sum is output as the correction torque. Further, this correction torque is added to the usual assist torque, and a sum is provided as the total assist torque to the electric motor as illustrated in FIG. 4.

When a "negative value" is derived in the calculation of "(θcom)−(θact)," a negative correction torque is generated as described above. When a "positive value" is derived in the calculation of "(θcom)−(θact)," a positive correction torque is generated as described above.

Figure 7:
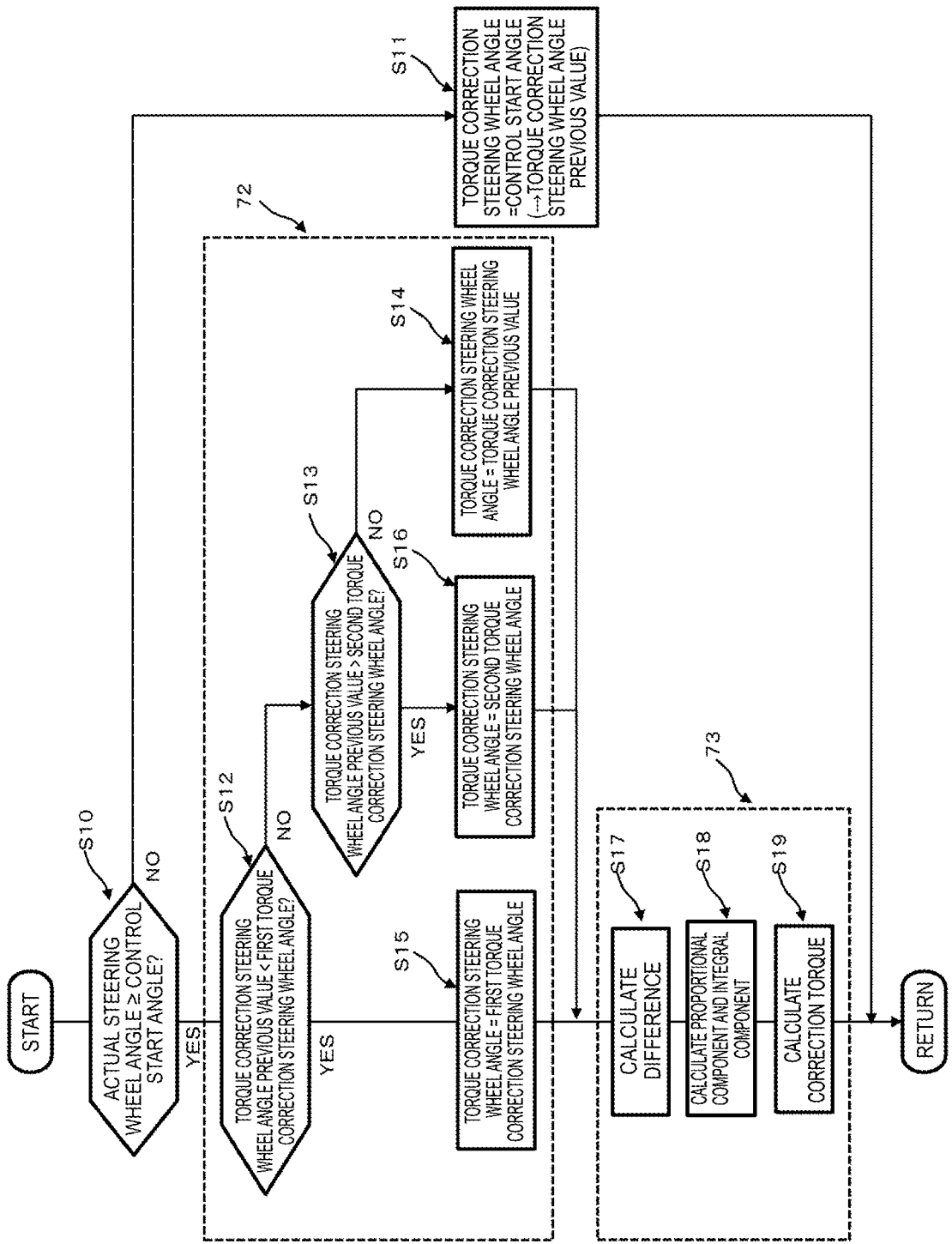
FIG. 7 is a flowchart for illustrating a control flow for implementing control blocks for obtaining a correction torque.

With reference to FIG. 7 and FIGS. 8, specific control of the torque correction function unit 71 having the function described above is now described. The torque correction function unit 71 is actually executed by control software of the control MCU 51 (see FIG. 3). FIG. 7 shows a specific processing flow thereof. FIG. 8 show a change in the torque correction steering wheel angle (θcom) in this processing. In this description, a neutral position of the steering wheel is set as a reference (=0°), and the steering wheel angle is defined to increase as the rack bar 5 approaches the stroke end side.

First, in FIG. 8(a), the actual steering wheel angle (θact), the first torque correction steering wheel angle (θcom1) set on the neutral position side apart by the predetermined correction angle (−Δθ) from this actual steering wheel angle (θact), and the second torque correction steering wheel angle (θcom2) set on the stroke end side apart by the predetermined correction angle (+Δθ) from this actual steering wheel angle (θact) under the state in which the rack bar 5 approaches the stroke end and comes in contact with a structure member (stopper mechanism) in a vicinity of the stroke end, and then, the rack bar 5 bounces back are shown.

Moreover, the torque correction steering wheel angle (θcom) actually set is indicated by the thick broken line. Further, the correction torque is obtained by applying the proportional integral control to the angle difference between the torque correction steering wheel angle (θcom) and the actual steering wheel angle (θact) shown in FIG. 8(b).

With reference to the flowchart of FIG. 7, the specific processing flow is now described. In this processing flow, a torque correction steering wheel angle previous value (θprv)

used in control steps described below is updated in each execution loop of the flowchart.

<<Step S10>>

In Step S10, it is determined whether or not the actual steering wheel angle (θact) is larger than a control start angle (θsrt). This determination determines whether or not a state in which the rack bar 5 is moved toward the stroke end side by rotating the steering wheel is brought about.

The control start angle (θsrt) may also be changed in accordance with specifications of the automobile, and it is only required to set the most appropriate control start angle (θsrt). Moreover, the control start angle (θsrt) may also be changed based on an angular velocity of the operation rotation angle of the steering wheel. When the steering wheel is rotated fast, the rack bar 5 may quickly abut against the structure member (stopper mechanism) of the stroke end. In this case, it is only required to move the control start angle (θsrt) closer to the neutral position side as the operation angular velocity is higher.

As described above, the state in which the control start angle (θsrt) is larger than the actual steering wheel angle (θact) means that the steering wheel is rotated more with respect to the neutral position of the steering wheel.

In Step S10, when the actual steering wheel angle (θact) is determined smaller (NO) than the control start angle (θsrt), the process proceeds to Step S11. When the actual steering wheel angle (θact) is determined larger (YES) than the control start angle (θsrt), the process proceeds to Step S12.

<<Step S11>>

The actual steering wheel angle (θact) is determined smaller than the control start angle (θsrt) in Step S10, and hence the torque correction steering wheel angle is set to the control start angle (θsrt) in Step S11. This setting is made to use the control start angle (θsrt) as the torque correction steering wheel angle previous value (θprv) required for control at the time when the actual steering wheel angle (θact) is determined larger than the control start angle (θsrt) in the determination of Step S10.

When the torque correction steering wheel angle previous value (θprv) is set in Step S11, the process proceeds through to return and wait for the next execution timing.

<<Step S12>>

The actual steering wheel angle (θact) is determined larger (YES) than the control start angle (θstrt) in Step S10, and hence a state in which the steering wheel is greatly rotated exists. For example, rotation of the steering wheel for "stationary steering," rotation of the steering wheel for "turn-back," and the like correspond to this state. In this case, the phenomenon in which the rack bar 5 collides with the structure member (stopper mechanism) of the stroke end occasionally occurs.

In Step S12, it is determined whether or not the torque correction steering wheel angle previous value (θprv) is smaller than the first torque correction steering wheel angle (θcom1). When the torque correction steering wheel angle previous value (θprv) is determined larger (NO) than the first torque correction steering wheel angle (θcom1) in this determination, the process proceeds to Step S13. Meanwhile, when the torque correction steering wheel angle previous value (θprv) is determined smaller (YES) than the first torque correction steering wheel angle (θcom1) in this determination, the process proceeds to Step S15.

A reason for the determination that the torque correction steering wheel angle previous value (θprv) is larger (NO) than the first torque correction steering wheel angle (θcom1) is that the torque correction steering wheel angle previous value (θprv) being the control start angle (θsrt) set in Step S11 is larger than the first torque correction steering wheel angle (θcom1) obtained by subtracting the correction angle (Δθ) from the actual steering wheel angle (θact).

<<Step S13>>

The torque correction steering wheel angle previous value (θprv) is determined larger (NO) than the first torque correction steering wheel angle (θcom1) in Step S12, and hence it is determined in Step S13 whether or not the torque correction steering wheel angle previous value (θprv) is larger than the second torque correction steering wheel angle (θcom2). When the torque correction steering wheel angle previous value (θprv) is determined smaller (NO) than the second torque correction steering wheel angle (θcom2) in this determination, the process proceeds to Step S14. Meanwhile, when the torque correction steering wheel angle previous value (θprv) is determined larger (YES) than the second torque correction steering wheel angle (θcom2) in this determination, the process proceeds to Step S16.

A reason for the determination that the torque correction steering wheel angle previous value (θprv) is smaller (NO) than the second torque correction steering wheel angle (θcom2) is that the torque correction steering wheel angle previous value (θprv) being the control start angle (θsrt) set in Step S11 is smaller than the second torque correction steering wheel angle (θcom2) obtained by adding the correction angle (Δθ) to the actual steering wheel angle (θact).

As described above, the determination of "NO" in Step S12 and Step S13 indicates that the torque correction steering wheel angle previous value (θprv) is positioned between the first torque correction steering wheel angle (θcom1) and the second torque correction steering wheel angle (θcom2).

However, the actual steering wheel angle (θact) increases moment by moment as the steering wheel rotates, and hence the first torque correction steering wheel angle (θcom1) and the second torque correction steering wheel angle (θcom2) also change toward the increasing direction at the next execution timing. Thus, the determinations of Step S12 and Step S13 come to change.

<<Step S14>>

When the determination of "No" is made in Step S12 and Step S13, that is, the torque correction steering wheel angle previous value (θprv) is positioned between the first torque correction steering wheel angle (θcom1) and the second torque correction steering wheel angle (θcom2), the torque correction steering wheel angle (θcom) is set to the torque correction steering wheel angle previous value (θprv) in Step S14. The torque correction steering wheel angle previous value (θprv) is the control start angle (θsrt).

Thus, the torque correction steering wheel angle (θcom) as shown between a time (Ta) and a time (Tb) of FIG. 8(a) is set by executing the processing steps of Step S12, Step S13, and Step S14. Further, the angle difference between the actual steering wheel angle (θact) and the torque correction steering wheel angle (θcom) gradually increases toward the negative side between the time (Ta) and the time (Tb) as shown in FIG. 8(b).

When the torque correction steering wheel angle (θcom) is set, the process proceeds to Step S17. The processing steps of Step S17 and subsequent steps are the proportional integral control, and are described later.

<<Step S15>>

When the processing step of Step S15 is to be executed, the torque correction steering wheel angle previous value (θprv) is determined smaller (YES) than the first torque correction steering wheel angle (θcom1) in Step S12. A reason for the determination that the torque correction steering wheel angle previous value (θprv) is smaller (YES) than the first torque correction steering wheel angle (θcom1) is as follows.

That is, the actual steering wheel angle (θact) increases with respect to the torque correction steering wheel angle previous value (θprv) set in Step S14 as a result of elapse of time (progress of the rotation of the steering wheel), and the first torque correction steering wheel angle (θcom1) also increases accordingly. Thus, the torque correction steering wheel angle previous value (θprv) becomes smaller than the first torque correction steering wheel angle (θcom1), and the process consequently proceeds to Step S15.

In Step S15, the torque correction steering wheel angle (θcom) is set to the first torque correction steering wheel angle (θcom1). Moreover, this first torque correction steering wheel angle (θcom1) becomes the torque correction steering wheel angle previous value (θprv) at the next execution timing.

Thus, the torque correction steering wheel angle (θcom) is set to the first torque correction steering wheel angle (θcom1) until the torque correction steering wheel angle previous value (θprv) is determined larger (NO) than the first torque correction steering wheel angle (θcom1) in Step S12.

Thus, the first torque correction steering wheel angle (θcom1) as shown between the time (Tb) and the time (Tc) of FIG. 8(a) is set by executing the processing steps of Step S12 and Step S15. A period from the time (Tb) to a time (Tc) is a section until the rack bar 5 comes in contact with the structure member (stopper mechanism) of the stroke end, and the negative correction torque (torque for reducing the assist torque) is required in this section.

Thus, the angle difference between the actual steering wheel angle (θact) and the first torque correction steering wheel angle (θcom1) at this time is maintained at the constant correction angle (Δθ) on the negative side between the time (Tb) and the time (Tc) as shown in FIG. 8(b). As described above, by setting the constant correction angle (Δθ), there is provided such an effect that the proportional component does not excessively increase even when a proportional gain is increased to enhance following capability.

When the first torque correction steering wheel angle (θcom1) is set, the process proceeds to Step S17. The processing steps of Step S17 and the subsequent steps are the proportional integral control, and are described later.

<<Step S16>>

The first torque correction steering wheel angle (θcom1) is set until the rack bar 5 comes in contact with the structure member (stopper mechanism) of the stroke end in Step S15 described above, and the actual steering wheel angle (θact) changes to the direction toward the neutral position side when the rack bar 5 comes in contact with the structure member (stopper mechanism) of the stroke end and the bouncing back occurs.

Thus, Step S12, Step S13, and Step S14 described above are executed while the torque correction steering wheel angle previous value (θprv) is positioned between the first torque correction steering wheel angle (θcom1) and the second torque correction steering wheel angle (θcom2). In this case, the first torque correction steering wheel angle (θcom1) is set as the torque correction steering wheel angle previous value (θprv).

As described above, the torque correction steering wheel angle (θcom) as shown between the time (Tc) to a time (Te) of FIG. 8(a) is set by executing the processing steps of Step S12, Step S13, and Step S14. Moreover, the angle difference between the actual steering wheel angle (θact) and the torque correction steering wheel angle (θcom) at this time gradually decreases toward the positive side between the time (Tc) and a time (Td) as shown in FIG. 8(b) and gradually increases on the positive side between the time (Td) and the time (Te).

This is because the relationship between the torque correction steering wheel angle (θcom) and the actual steering wheel angle (θact) is inverted at the time (Td). When the torque correction steering wheel angle (θcom) is set, the process proceeds to Step S17. The processing steps of Step S17 and the subsequent steps are the proportional integral control, and are described later.

When the time (Te) is reached, Step S16 is executed. When the processing step of Step S16 is to be executed, the torque correction steering wheel angle previous value (θprv) is determined larger (YES) than the second torque correction steering wheel angle (θcom2) in Step S13. A reason for the determination that the torque correction steering wheel angle previous value (θprv) is larger (YES) than the second torque correction steering wheel angle (θcom2) is as follows.

That is, the torque correction steering wheel angle previous value (θprv) set in Step S15 is the first torque correction steering wheel angle (θcom1). Meanwhile, the actual steering wheel angle (θact) decreases as the time elapses (the steering wheel rotates backward due to the bouncing back of the rack bar), and the second torque correction steering wheel angle (θcom2) also decreases accordingly. Thus, the torque correction steering wheel angle previous value (θprv) becomes larger than the second torque correction steering wheel angle (θcom2), and the process consequently proceeds to Step S16.

In Step S16, the torque correction steering wheel angle (θcom) is set to the second torque correction steering wheel angle (θcom2). Moreover, this second torque correction steering wheel angle (θcom2) becomes the torque correction steering wheel angle previous value (θprv) at the next execution timing.

Thus, the torque correction steering wheel angle (θcom) is set to the second torque correction steering wheel angle (θcom2) until the torque correction steering wheel angle previous value (θprv) is determined smaller (NO) than the second torque correction steering wheel angle (θcom2) in Step S13.

Moreover, when the actual steering wheel angle (θact) returns to the control start angle (θsrt) in this state, the correction of the usual assist torque through use of the above-mentioned correction torque is finished due to the processing step of Step S10.

As described above, the second torque correction steering wheel angle (θcom2) as shown between the time (Te) and a time (Tf) of FIG. 8(a) is set by executing the processing steps of Step S13 and Step S16. Further, the angle difference between the actual steering wheel angle (θact) and the second torque correction steering wheel angle (θcom2) at this time is maintained at the constant correction angle (Δθ) on the positive side between the time (Te) and the time (Tf) as shown in FIG. 8(b). As described above, by setting the constant correction angle (Δθ), there is provided such an effect that the proportional component does not excessively increase even when a proportional gain is increased to enhance following capability.

When the second torque correction steering wheel angle (θcom2) is set, the process proceeds to Step S17. The processing steps of Step S17 and the subsequent steps are the proportional integral control, and are described later.

The above-mentioned processing steps of Step S12 to Step S16 correspond to the torque correction steering wheel angle calculation processing block 72 of FIG. 4. When the torque correction steering wheel angle (θcom) is obtained, the proportional integral control of Step S17 and the subsequent steps is executed.

<<Step S17>>

In Step S17, the angle difference between the actual steering wheel angle (θact) and the torque correction steering wheel angle (θcom) obtained in Step S12 to Step S16 is calculated. The calculated angle difference is the angle difference having the characteristic as shown in FIG. 8(b). The angle difference is a negative angle difference in the direction in which the rack bar 5 approaches the stroke end with the actual steering wheel angle (θact) as a reference, and is a positive angle difference in the direction in which the rack bar 5 bounces back and departs from the stroke end side after the time (Td). When the difference calculation is completed, the process proceeds to Step S18.

<<Step S18>>

In Step S18, calculation for obtaining the proportional component and the integral component is executed based on the angle difference obtained in Step S17. This calculation of the proportional component and the integral component is well-known technology. When the calculation of the proportional component and the integral component is completed, the process proceeds to Step S19.

<<Step S19>>

In Step S19, the correction torque is calculated by adding the proportional component and the integral component. As this correction torque, the negative correction torque and the positive correction torque are obtained from the negative angle difference and the positive angle difference, respectively, as described above. The obtained correction torque is added to the usual assist torque, to thereby obtain the total assist torque as illustrated in FIG. 4. This total assist torque is supplied to the electric motor as the drive current, to thereby assist in the steering.

The above-mentioned processing steps of Step S17 to Step S19 correspond to the proportional integral control processing block 73 of FIG. 4.

In the above-mentioned embodiment, the absolute value of the correction angle (−Δθ) set on the neutral position side from the actual steering wheel angle (θact) and the absolute value of the correction angle (+Δθ) set on the stroke end side from the actual steering wheel angle (θact) are the same values.

As another configuration, the correction angle (−Δθ) set on the neutral position side may be determined larger than the correction angle (+Δθ) set on the stroke end side. When the correction angle (−Δθ) set on the neutral position side is determined larger in this manner, the assist torque toward the direction of the stroke end can be reduced, and hence the bouncing back itself of the rack bar is suppressed.

Further, the correction angle (+Δθ) set on the stroke end side may be determined larger than the correction angle (−Δθ) set on the neutral position side. When the correction angle (+Δθ) set on the stroke end side is determined larger in this manner, the bouncing back of the rack bar is further suppressed. As a result, the return of the steering wheel caused by the bouncing back can further be suppressed.

In the above-mentioned embodiment, the electric power steering device which applies the assist torque to the steering member through use of the steering actuator has been described. However, this technology can be applied to an electric power steering device of the so-called steer-by-wire type having a configuration in which the steering shaft is disconnected from the rack bar, the turn angle, the turn direction, and the turn torque of the steering shaft, and the like are detected, and the rotation of the electric motor is controlled based on detection signals thereof, to thereby directly drive the rack bar.

The control device according to the present invention is used for a vehicle including: a steering wheel configured to steer the vehicle; a steering member configured to steer steered wheels in accordance with rotation of the steering wheel; and a steering actuator configured to apply a steering force to the steering member, and includes a control unit configured to output, to the steering actuator, a drive signal for applying the steering force based on steering information on the steering wheel. The control unit is configured to output, to the steering actuator, a drive signal for reducing the steering force until the steering member reaches a stroke end after a rotation angle of the steering wheel reaches a predetermined control start angle and increasing the steering force when the steering member reaches the stroke end and then bounces back.

With this configuration, the occurrence of the impact noise caused by the abutment and the occurrence of the unintended rotation of the steering wheel caused by the bouncing back after the abutment can be suppressed, to thereby enable operation feeling before and after the stroke end to be increased.

Note that, the present invention is not limited to the embodiment described above, and includes further various modification examples. For example, in the embodiment described above, the configurations are described in detail in order to clearly describe the present invention, but the present invention is not necessarily limited to an embodiment that includes all the configurations that have been described. Further, a part of the configuration of a given embodiment can be replaced by the configuration of another embodiment, and the configuration of another embodiment can also be added to the configuration of a given embodiment. Further, another configuration can be added to, deleted from, or replace a part of the configuration of each of the embodiments.

The present application claims a priority based on Japanese Patent Application No. 2021-191836 filed on Nov. 26, 2021. All disclosed contents including Specification, Scope of Claims, Drawings, and Abstract of Japanese Patent Application No. 2021-191836 filed on Nov. 26, 2021 are incorporated herein by reference in their entirety.

REFERENCE SIGNS LIST

5 . . . rack bar, 17 . . . electric motor, 19 . . . controller, 70 . . . usual assist torque calculation processing block, 71 . . . torque correction function unit, 72 . . . torque correction steering wheel angle calculation processing block, 73 . . . proportional integral control processing block, 74 . . . addition block, 75 . . . difference calculation unit, 76 . . . proportional control unit, 77 . . . integral control unit, 78 . . . addition unit

The invention claimed is:

1. A control device, which is to be used for a vehicle including:
   a steering wheel configured to steer the vehicle;
   a steering member configured to steer steered wheels in accordance with rotation of the steering wheel; and
   a steering actuator configured to apply a steering force to the steering member, the control device comprising a control unit configured to output, to the steering actuator, a drive signal for applying the steering force based on steering information on the steering wheel,
wherein the control unit includes a usual steering force generation unit configured to generate a usual steering force, and a correction steering force generation unit configured to generate a correction steering force that corrects the usual steering force, and
wherein the correction steering force generation unit is configured to generate a negative correction steering force that reduces the usual steering force until the steering member reaches the stroke end after a rotation angle of the steering wheel reaches a predetermined control start angle, to generate a positive correction steering force that increases the usual steering force when the steering member reaches the stroke end and then bounces back, and to output a drive signal to the steering actuator.

2. The control device according to claim 1, wherein the usual steering force generation unit is configured to apply the usual steering force to the steering member through use of the steering actuator independently of a manual steering force applied by the steering wheel to the steering member.

3. The control device according to claim 2,
wherein the correction steering force generation unit includes:
a torque correction steering wheel angle calculation unit configured to obtain a first torque correction steering wheel angle obtained by subtracting a predetermined first correction angle from an actual steering wheel angle, and a second torque correction steering wheel angle obtained by adding a predetermined second correction angle to the actual steering wheel angle; and
a proportional integral control unit configured to obtain an angle difference between the first torque correction steering wheel angle or the second torque correction steering wheel angle, which is obtained by the torque correction steering wheel angle calculation unit, and the actual steering wheel angle, and to obtain the negative correction steering force or the positive correction steering force by applying proportional integral control to the angle difference, and
wherein the correction steering force generation unit is configured to correct, through use of the correction steering force obtained by the proportional integral control unit, the usual steering force generated by the usual steering force generation unit.

4. The control device according to claim 3, wherein the torque correction steering wheel angle calculation unit is configured to obtain a torque correction steering wheel angle at a predetermined calculation cycle, and to output, in a current calculation cycle:
the first torque correction steering wheel angle when the torque correction steering wheel angle obtained in a previous calculation cycle is smaller than the first torque correction steering wheel angle;
the second torque correction steering wheel angle when the torque correction steering wheel angle obtained in the previous calculation cycle is larger than the second torque correction steering wheel angle; and
the torque correction steering wheel angle obtained in the previous calculation cycle when the torque correction steering wheel angle obtained in the previous calculation cycle is between the first torque correction steering wheel angle and the second torque correction steering wheel angle.

5. The control device according to claim 3, wherein the torque correction steering wheel angle calculation unit is configured to set the predetermined second correction angle larger than the predetermined first correction angle.

6. The control device according to claim 3, wherein the torque correction steering wheel angle calculation unit is configured to set the predetermined first correction angle larger than the predetermined second correction angle.

7. The control device according to claim 1, wherein the control unit is configured to change the predetermined control start angle in accordance with an angular velocity of the rotation angle of the steering wheel.

8. A control method, which is executed by a control unit in a vehicle including:
a steering wheel configured to steer the vehicle;
a steering member configured to steer steered wheels in accordance with rotation of the steering wheel; and
a steering actuator configured to apply a steering force to the steering member,
the control unit being configured to output, to the steering actuator, a drive signal for applying the steering force based on steering information on the steering wheel,
the control method comprising the steps of:
outputting, to the steering actuator, a drive signal for reducing the steering force until the steering member reaches a stroke end after a rotation angle of the steering wheel reaches a predetermined control start angle; and
outputting, to the steering actuator, a drive signal for increasing the steering force when the steering member reaches the stroke end and then bounces back.

9. A control method, which is executed by a control unit in a vehicle including:
a steering wheel configured to steer the vehicle;
a steering member configured to steer steered wheels in accordance with rotation of the steering wheel; and
a steering actuator configured to apply a steering force to the steering member,
the control unit being configured to output, to the steering actuator, a drive signal for applying the steering force based on steering information on the steering wheel,
the control method comprising the steps of:
obtaining a first torque correction steering wheel angle obtained by subtracting a predetermined first correction angle from an actual steering wheel angle, and a second torque correction steering wheel angle obtained by adding a predetermined second correction angle to the actual steering wheel angle after a rotation angle of the steering wheel reaches a predetermined control start angle;
obtaining an angle difference between the first torque correction steering wheel angle or the second torque correction steering wheel angle and the actual steering wheel angle;
obtaining a negative correction steering force or a positive correction steering force by applying proportional integral control to the angle difference; and
correcting the steering force through use of the negative correction steering force or the positive correction steering force.

10. An electric power steering device, comprising:
a steering member configured to steer steered wheels in accordance with rotation of a steering wheel mounted to a vehicle;

a steering actuator configured to apply a steering force to the steering member; and a control device that includes a control unit configured to output, to the steering actuator, a drive signal for applying the steering force based on steering information on the steering wheel, wherein the control unit includes a usual steering force generation unit configured to generate a usual steering force, and a correction steering force generation unit configured to generate a correction steering force that corrects the usual steering force, and wherein the correction steering force generation unit is configured to generate a negative correction steering force that reduces the usual steering force until the steering member reaches the stroke end after a rotation angle of the steering wheel reaches a predetermined control start angle, to generate a positive correction steering force that increases the usual steering force when the steering member reaches the stroke end and then bounces back, and to output a drive signal to the steering actuator.

11. The electric power steering device according to claim 10, wherein the usual steering force generation unit is configured to apply the usual steering force to the steering member through use of the steering actuator independently of a manual steering force applied by the steering wheel to the steering member.

12. The electric power steering device according to claim 11, wherein the correction steering force generation unit includes:

a torque correction steering wheel angle calculation unit configured to obtain a first torque correction steering wheel angle obtained by subtracting a predetermined first correction angle from an actual steering wheel angle and a second torque correction steering wheel angle obtained by adding a predetermined second correction angle to the actual steering wheel angle; and a proportional integral control unit configured to obtain an angle difference between the first torque correction steering wheel angle or the second torque correction steering wheel angle, which is obtained by the torque correction steering wheel angle calculation unit, and the actual steering wheel angle, and to obtain the negative correction steering force or the positive correction steering force by applying proportional integral control to the angle difference, and wherein the correction steering force generation unit is configured to correct, through use of the correction steering force obtained by the proportional integral control unit, the usual steering force generated by the usual steering force generation unit.

13. The electric power steering device according to claim 12, wherein the torque correction steering wheel angle calculation unit is configured to obtain a torque correction steering wheel angle at a predetermined calculation cycle, and to output, in a current calculation cycle:

the first torque correction steering wheel angle when the torque correction steering wheel angle obtained in a previous calculation cycle is smaller than the first torque correction steering wheel angle;

the second torque correction steering wheel angle when the torque correction steering wheel angle obtained in the previous calculation cycle is larger than the second torque correction steering wheel angle; and the torque correction steering wheel angle obtained in the previous calculation cycle when the torque correction steering wheel angle obtained in the previous calculation cycle is between the first torque correction steering wheel angle and the second torque correction steering wheel angle.

14. The electric power steering device according to claim 12, wherein the torque correction steering wheel angle calculation unit is configured to set the predetermined second correction angle larger than the predetermined first correction angle.

15. The electric power steering device according to claim 12, wherein the torque correction steering wheel angle calculation unit is configured to set the predetermined first correction angle larger than the predetermined second correction angle.

16. The electric power steering device according to claim 10, wherein the control unit is configured to change the predetermined control start angle in accordance with an angular velocity of the rotation angle of the steering wheel.

* * * * *